United States Patent
LaScala

(10) Patent No.: US 7,406,753 B2
(45) Date of Patent: Aug. 5, 2008

(54) TWO-PIECE TIE DOWN CLIP FOR SHEET MATERIAL

(76) Inventor: Patrick J. LaScala, P.O. Box 94, City Island, NY (US) 10464

( * ) Notice: Subject to any disclaimer, the term of this patent is extended or adjusted under 35 U.S.C. 154(b) by 0 days.

(21) Appl. No.: 11/505,379

(22) Filed: Aug. 17, 2006

(65) Prior Publication Data

US 2008/0040902 A1    Feb. 21, 2008

(51) Int. Cl.
*F16G 11/00* (2006.01)
(52) U.S. Cl. .................... 24/460; 296/136.02
(58) Field of Classification Search ............. 24/115 M, 24/460, 136 L, 136 R; 296/136.1
See application file for complete search history.

(56) References Cited

U.S. PATENT DOCUMENTS

| | | | | |
|---|---|---|---|---|
| 231,574 A | * | 8/1880 | Heinze | 24/136 R |
| 808,653 A | * | 1/1906 | Hall et al. | 223/96 |
| 1,218,769 A | * | 3/1917 | Hill | 24/477 |
| 2,063,429 A | * | 12/1936 | Gordon | 24/477 |
| 2,125,540 A | * | 8/1938 | Carlson | 24/477 |
| 2,837,804 A | * | 6/1958 | Danell | 24/349 |
| 4,686,748 A | * | 8/1987 | Kaivanto | 24/522 |
| 5,979,196 A | * | 11/1999 | Vanmoor | 70/57.1 |
| 6,070,629 A | * | 6/2000 | Whiteside | 150/166 |
| 2004/0074577 A1 | * | 4/2004 | Tavelli et al. | 150/166 |

* cited by examiner

*Primary Examiner*—Robert J Sandy
(74) *Attorney, Agent, or Firm*—Donald W. Meeker

(57) ABSTRACT

A two-piece clip for tying down a sheet of material has an elongated triple tapered wedge insertable in a mating triple tapered groove. The two components bind the covering material therebetween with a tight friction fit and compress a relatively large area of material, especially plastic material with a built-in reinforcing fiber grid. The clip binds a large number of rows and columns of reinforcing elements of a plastic cover sheet in a tight friction fit therebetween for a secure grip and easy release without damaging the material.

6 Claims, 2 Drawing Sheets

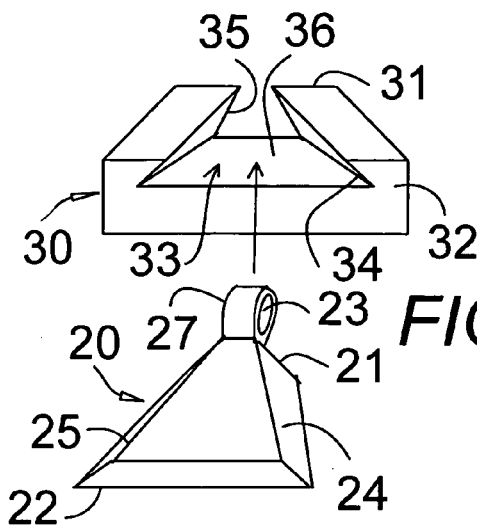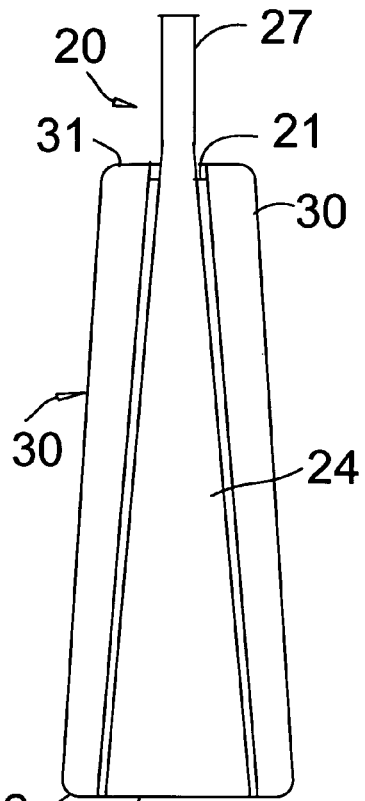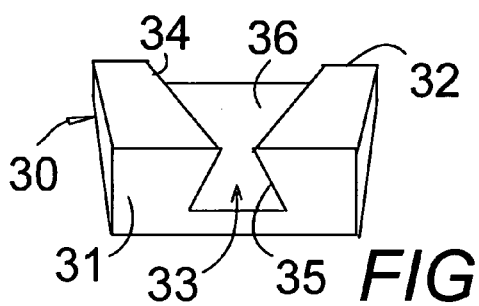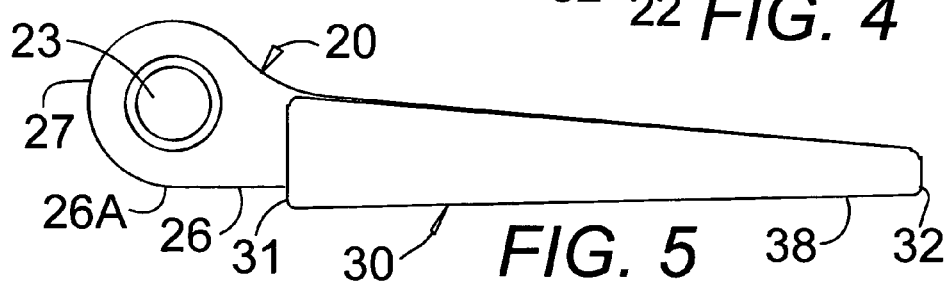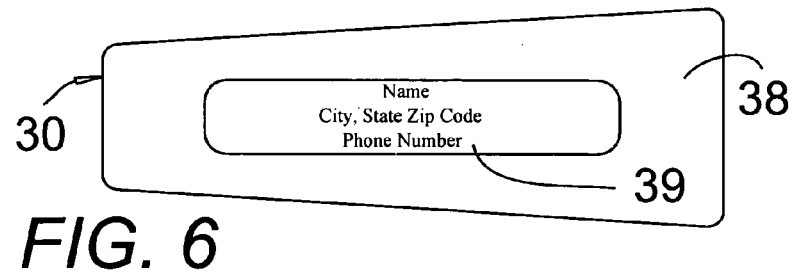

TWO-PIECE TIE DOWN CLIP FOR SHEET MATERIAL

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to clips having dissociable gripping members and particularly to a two-piece tie down clip to attach to a flexible sheet, the clip comprising a first triple tapered wedge member with means to receive a rope or cord and a second mating triple tapered groove member which is placed behind the sheet material, whereby the first wedge member can slide into the second groove member with the flexible sheet clamped between by binding the sheet in a tight friction fit.

2. Description of Related Art

Including information disclosed under 37 CFR 1.97 and 1.98

A variety means for fastening tarps and other sheet materials are known in the art. In the case of tarps, the cloth is provided with a plurality of holes along its margin through which rope or cord can be threaded to secure the tarp in a desired position. These holes in the tarp are often reinforced with grommets to prevent damage to the material. Unfortunately, the grommets often rip out of the tarp and the tarp becomes ripped or frayed. Edge-securing clips have been devised to use in place of the holes in a tarp, some of which pierce the tarp creating further damage, others comprise clamps or adhesively secured devices which lose their holding ability over time.

U.S. Pat. No. 4,686,748, issued Aug. 18, 1987 to Kaivanto, is for an attachment device that comprises a clamp for attaching to a flexible sheet. The clamp has a first member with sides narrowing longitudinally to a first end and inclining upwardly inwardly. The first member can receive an attachment. A second member comprises a main body formed with a recess that narrows longitudinally to a first end and with interior sides that incline upwardly inwardly. Thus the first member can be received within the second member with the flexible sheet clamped between.

U.S. Pat. No. 1,975,000, issued Sep. 25, 1934 to Beaumont, provides a curtain attachment device which comprises a base channel member having a suspending means attached thereto which is placed behind a curtain. The device further comprises a wedge member which is placed in front of the curtain and fit within the base channel member, clamping the curtain between the two members.

U.S. Pat. No. 2,837,804, issued Jun. 10, 1958 to Danell, shows a hanger for holding vertically oriented sheet material. The hanger includes a back portion having a vertical dovetailed slot with forwardly extending side walls, and a hanging portion having a tapered end. The tapered end of the hanging portion is placed in front of the sheet material and then fitted within the back portion, clamping the sheet material between the two portions.

U.S. Pat. No. 2,125,540, issued Aug. 2, 1938 to Carlson, claims a fastening device that comprises a tapered receptacle and a tapered wedge for fitting within the tapered receptacle for holding a stocking and distributing the gripping surface over a large area, thereby avoiding damage to the stocking.

U.S. Pat. No. 1,218,769, issued Mar. 13, 1917 to Hill, describes a garment clasp for a stocking or the like which comprises a clasp having a tapering form, a pair of opposed channels along its edges and a strap attaching element. The device further comprises a flat tapered wedge piece which fits within the clasp to trap and hold the edge of the stocking.

U.S. Pat. No. 2,089,221, issued Aug. 10, 1937 to Patur, discloses a two-part securing means for attaching ornaments, flowers or the like to a garment. The device comprises a wedge to which the flowers or ornaments are attached, and a wedge-receiving base which is placed behind the garment. The wedge is fitted within the base with the garment clamped therebetween.

U.S. Pat. No. 2,063,429, issued Dec. 8, 1936 to Gordon, indicates a clasp or fastener for use with hosiery which comprises a female base member and a wedge-shaped male member. The wedge-shaped member can be received within the female member with the hose clamped therebetween.

U.S. Pat. No. 3,785,003, issued Jan. 15, 1974 to Thomson, puts forth a curtain hanger which includes a body having a vertical dovetailed slot with forwardly extending side walls, one of which is wider than the other, each of the forward edges of the side walls having a flange extending towards the other wall. The hanger includes a keeper or tongue element complimentary in shape to the space defined by the walls of the body member and adapted to engage drapery material which is slid into the slot by sideways insertion of the tongue towards the wider side wall.

U.S. Pat. No. 6,789,295, issued Sep. 14, 2004 to Svensson, concerns a clamp apparatus for application to an object, for example a plate, a sheet, a fabric or a thin film, by gripping two opposite sides of the object. For this purpose, the apparatus comprises a tubular element with an inner passage with a cross section which tapers in the direction of one end of the element and a clamp surface projecting from the opposite end of the element. A wedge shaped element with a tapering section is insertable into the passage via its wide opening. Thereby, a nip is formed in the co-operation between the wedge shaped element and the clamp surface.

U.S. Pat. No. 5,692,272, issued Dec. 2, 1997 to Woods, illustrates a two-part clip for the purpose of securely holding fabric or sheet material without damaging said material. The clip consists of a U-shaped body with an angled cavity and a wedge which is angled to fit snugly into the cavity. An additional component of the invention is a section of rope which is passed through a hole, first in the wedge, then through a hole in the body of the clip. The fabric to be secured is inserted into the cavity on either the top or the bottom of the wedge. As tension is applied to the rope, the wedge becomes firmly seated in the cavity, thus securing the fabric.

What is needed is an easy to install clip attachable to any portion of a sheet of covering material which is easy to attach to the material and exerts a strong long-lasting grip on the material without tearing the material.

BRIEF SUMMARY OF THE INVENTION

An object of the present invention is to provide a two piece clip for tying down a sheet of material comprising an elongated triple tapered wedge insertable in a mating triple tapered groove binding the covering material therebetween with a tight friction fit compressing a relatively large area of material, especially plastic material with a built-in reinforcing fiber grid, including binding a large number of rows and columns of reinforcing strings of a plastic cover sheet in a tight friction fit therebetween for a secure grip without damaging the material.

A related object of the present invention is to provide a wedge component which has a narrow tall insertion edge for ease of grip and ease of fitting within the wide open end of the groove with the material therebetween, the insertion edge narrow in the front with a flat bottom below a raised gripping and tie down loop, the wedge component tapering outward from side to side and tapering downward from top to bottom along the length of the wedge with angled side edges tapering out to a wide bottom and to a wide low trailing end of the wedge so that it inserts easily and tightens substantially in the mating groove of the bottom component of the clip and the smooth flat bottom of the wedge engages the smooth flat bottom surface of the groove, and an elevated loop at the insertion end of the wedge to grip for installing the wedge in the groove and to receive the tie-down rope or cord for an easy to install clip attachable to any portion of a sheet of covering material which is easy to attach to the material and exerts a strong long-lasting grip on the material, wherein the loop bottom is level with the insert so the wedge piece is easy to insert by holding the loop and pulling the double tapered wedge into the double tapered groove on the other side of the sheet of covering material.

Another object of the present invention is to fabricate the two piece clip out of a synthetic nylon material so that the clip slides easily and resists weathering.

One more object of the present invention is to use a sheet of covering material with a grid pattern of reinforcing fibers for strength and to provide a wide and long wedge and groove to bind a large number of the reinforcing fibers therebetween to insure a strong long-lasting grip without tearing the material.

In brief, the present invention provides a two-piece clip for tying down a sheet of material that comprises an elongated triple tapered wedge insertable in a mating triple tapered groove, binding the covering material therebetween with a tight friction fit and compressing a relatively large area of material, especially plastic material with a built-in reinforcing fiber grid, including binding a large number of rows and columns of reinforcing strings of a plastic cover sheet in a tight friction fit therebetween for a secure grip and easy release without damaging the material.

An advantage of the present invention is that it easily grips and easily releases a portion of a sheet of material between its two wedge shaped components.

Another advantage of the present invention is that it provides a tight friction fit to hold a sheet of material between the two pieces of the clip.

One more advantage of the present invention is that the two wedge-shaped components slide together quickly and easily.

An additional advantage of the present invention is that the raised gripping and tie down loop provides ease in the mating of the two components.

A related advantage of the present invention is that the raised gripping and tie down loop allows a tie down rope or cord to be easily inserted therethrough.

A further advantage of the present invention is that it resists weathering.

A contributory advantage of the present invention is that it provides a stronger hold on a plastic sheet with a grid pattern of reinforcing fibers by gripping a number of the vertical and horizontal fibers in one clip.

BRIEF DESCRIPTION OF THE SEVERAL VIEWS OF THE DRAWINGS

These and other details of my invention will be described in connection with the accompanying drawings, which are furnished only by way of illustration and not in limitation of the invention, and in which drawings:

FIG. 2 is a perspective view of the two components of the invention of FIG. 1 aligned for insertion of the triple tapered wedge clip component into the mating triple tapered groove of the groove clip component;

FIG. 3 is a perspective view of the groove clip component of FIG. 2 showing an alternate face of the groove clip component;

FIG. 4 is a top plan view of the invention of FIG. 2 with the wedge clip component inserted in the groove clip component;

FIG. 5 is a side elevational view of the invention of FIG. 2 with the wedge clip component inserted in the groove clip component;

FIG. 6 is a bottom plan view of the groove clip component showing a space for indicia on the bottom surface thereof.

DETAILED DESCRIPTION OF THE INVENTION

Figure 1:
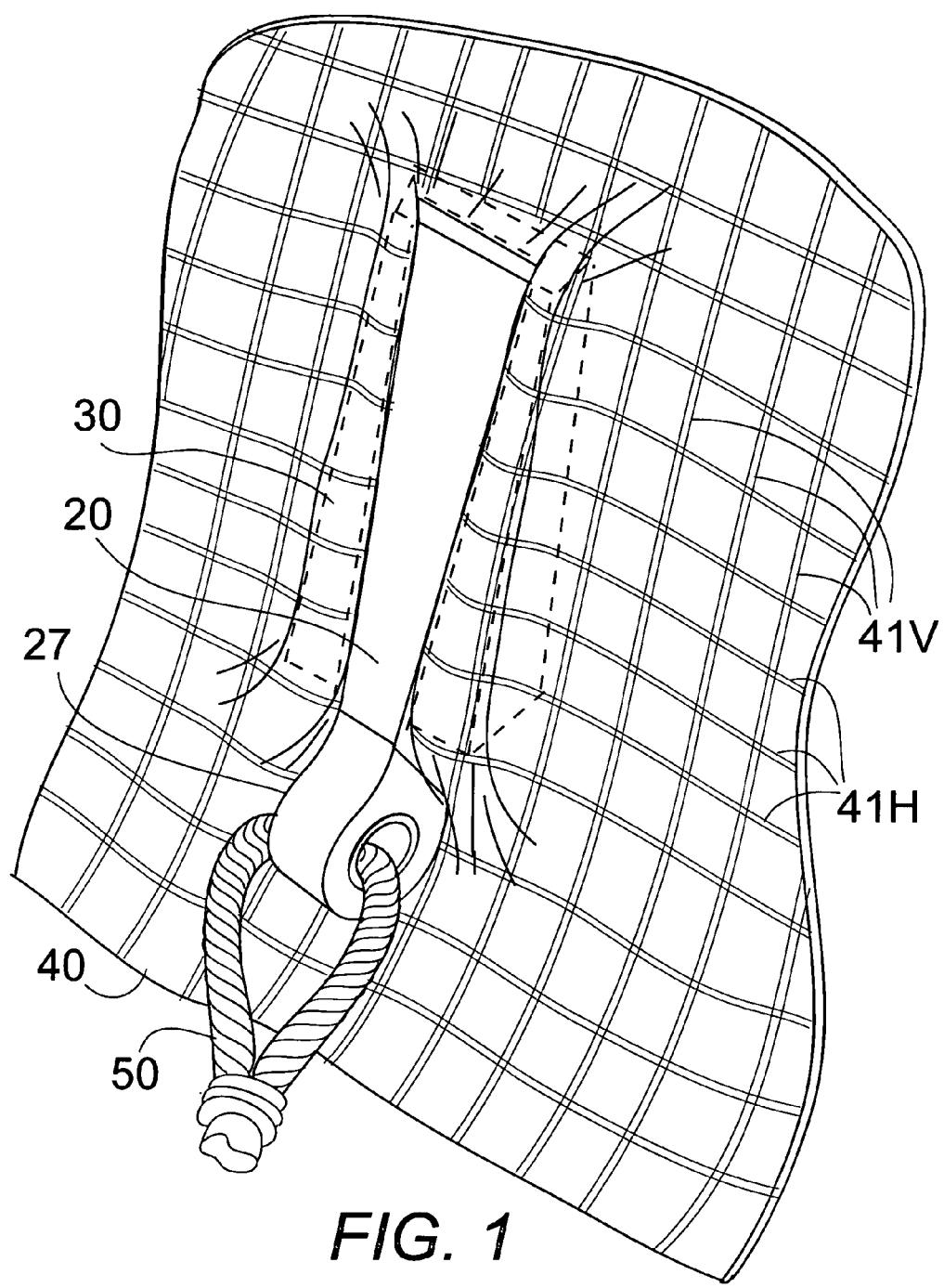
FIG. 1 is a perspective view of the two-piece clip device of the present invention shown binding a portion of a sheet of material with a triple tapered wedge clip component on top of the material inserted into a mating triple tapered groove of a groove clip component (shown dashed) underneath the material with the sheet of material sandwiched therebetween and a tie down rope or cord element attached to the protruding loop of the invention.

In FIGS. 1-6, a two-piece clip device comprises a wedge clip component 20 and a groove clip component 30 for sliding together with one component on each side of a sheet of material 40 to tie down the sheet of material.

An elongated triple tapered groove clip 30 component is positioned on one side of a sheet of material 40. The groove clip component comprises a flat outer bottom portion 38 for bearing indicia 39 thereon, as shown in FIG. 6, and a top surface having a triple tapered groove 33 open along the length of the top surface, as shown in FIG. 2. The groove tapers inwardly from side to side from a wide front opening in a front face 32 of the groove clip component to a narrow back opening in a back face 31 of the groove clip component, and tapers from a low front opening at the front face 32 to a high opening at a back face 31, and also tapers from a narrower top slot opening to a wider flat groove bottom surface 36 of the groove to form sloping inner sides 34 and 35 of the groove.

A mating elongated triple tapered wedge clip component 20 is positioned on an opposite side of the sheet of material 40, aligned for engagement with the groove clip component 30 to bind a portion of the sheet of material 40 therebetween. The wedge clip component comprises a triple tapered wedge portion with a flat wedge bottom 26, as shown in FIG. 5, which slides into the mating triple tapered groove 33 of the groove clip component 30 with the flat wedge bottom 26 and the flat groove bottom 36 in parallel alignment. The wedge clip component further comprises an upwardly protruding loop 27, shown in FIGS. 1, 2, 4, and 5, at an insertion end 21 of the wedge clip component 20 for gripping the wedge clip component to slide the wedge clip component 20 into the mating triple tapered groove 33 of the groove clip component 30 and for attaching a tie down element 50, such as a rope or cord, through the opening 23 of the protruding loop 27 for tying down the sheet of material 4. A loop bottom 26A of the upwardly protruding loop is tangent to the flat surface of the flat wedge bottom 26 of the triple tapered wedge clip portion, so that the flat wedge bottom 26 is aligned with the flat groove bottom 36 of the groove clip component 30 during an entire insertion of the wedge clip component into the groove clip component with the upwardly protruding loop 27 above the wedge clip component for gripping. The triple tapered wedge portion tapers from a narrow insertion end 21 insertable in the wide front opening of the front end 32 of the wedge clip component 30 to a wide opposite binding end 22 which is engaged by the low front opening of the back end 31 of the groove clip component 30 after insertion of the wedge clip component in the groove clip component. The wedge clip component also tapers from a high insertion end 21 which engages the high back end 31 of the groove clip component after insertion to a low binding end 22 which engages with the low front opening of front end 32 of the groove clip component after insertion. The wedge clip component outer sides 24 and 25 taper from a narrow top to a wider flat bottom to form sloping outer sides so that the sloping outer sides 24 and 25 of the wedge clip component engage the sloping inner sides 34 and 35 of the wedge clip component 30 after insertion and the flat wedge bottom 26 engages the flat groove bottom 36 after insertion thereby forming a two-piece clip device to bind any desired portion of the sheet of material 40 between the wedge clip 20 component and the groove clip component 30 with the portion of the sheet of material 40 sandwiched between the sides and the bottoms of the clip components. A series of two-piece clip devices can be spaced apart around a sheet of material at any desired locations on the sheet of material, each engaging a portion of the sheet of material and each of the protruding loops receiving a tie down element 50 attached thereto to tie down the sheet of material, with each of the two-piece clip devices having a length and width sufficient to bind a portion of the sheet of material and securely hold it down without tearing the sheet of material.

The wedge clip component and groove clip component are each preferably fabricated of a synthetic nylon material so that the components slide easily and resist weathering.

In a preferred embodiment, as shown in FIG. 1, the sheet of material comprises a sheet of material 40 with a grid pattern of intersecting reinforcing elements 41H and 41V formed in the sheet of material and the two-piece clip device has a width sufficient to engage a plurality of reinforcing elements and a length sufficient to engage a plurality of reinforcing elements.

The sheet of material 40 may be a sheet of cover material for a boat and a series of the two-piece clip devices are positioned as desired on the sheet of cover material adjacent to tie down locations on the boat to be covered. In this embodiment, the sheet of cover material for a boat comprises a sheet of synthetic material with a grid pattern of intersecting horizontal and vertical reinforcing elements formed in the sheet of material and the two-piece clip device has a width sufficient to engage a plurality of vertical reinforcing elements 40V and a length sufficient to engage a plurality of horizontal reinforcing elements 40H when the two-piece clip is attached with a long centerline of the two-piece clip in a vertical orientation.

In use, the sheet of material may be a sheet of cover material and a series of the two-piece clip devices are positioned as desired on the sheet of cover material adjacent to tie down locations on an object to be covered. The user places the wedge groove component on one side of a portion of the sheet of material, and while holding the wedge groove component in one hand, grips the upwardly protruding loop on the wedge clip component with the other hand on the other side of the sheet of material, and slides the wedge clip component into alignment with the wedge groove component so that the two components mate with the portion of the sheet of material sandwiched between them and secured by a tight friction fit. A tie down element such as a rope or cord is then inserted through the opening in the upwardly protruding loop on the wedge clip component and secured to a tie down position on the object to be covered. The user can then proceed to position a series of clip devices at desired intervals on the sheet of material to correspond to the other tie down positions on the object to be covered, tying each clip to its respective tie down location with a tie down element until the entire sheet of covering material is secured on the object to be covered. To release the clip, the user slides the wedge clip component toward the back end of the wedge groove component, disengaging the covering material.

It is understood that the preceding description is given merely by way of illustration and not in limitation of the invention and that various modifications may be made thereto without departing from the spirit of the invention as claimed.

What is claimed is:

1. A two-piece clip device for tying down a sheet of material, the device comprising:

an elongated triple tapered groove clip component positioned on one side of a sheet of material, the groove clip component comprising a flat outer bottom portion for bearing indicia thereon, and a top surface having a triple tapered groove open along the length of the top surface, the groove tapering inwardly from side to side from a wide front opening in a front face of the groove clip component to a narrow back opening in a back face of the groove clip component, the groove tapering from a low front opening at the front face to a high opening at the back face and the groove tapering from a narrower top slot opening to a wider flat groove bottom surface of the groove to form sloping inner sides of the groove, the flat groove bottom surface comprising a flat smooth plane from the front face to the back face; and a mating elongated triple tapered wedge clip component positioned on an opposite side of the sheet of material aligned with the groove clip component for engagement therewith to bind a portion of the sheet of material therebetween, the wedge clip component comprising a triple tapered wedge portion with a flat wedge bottom which slides into the mating triple tapered groove of the groove clip component with the flat wedge bottom and the flat groove bottom surface in parallel alignment sandwiching a portion of the sheet of material therebetween with the flat wedge bottom in full sliding contact with the top of the material and the flat groove bottom in full sliding contact with the bottom of the material and an upwardly protruding loop positioned entirely above the wedge bottom so that the loop does not interfere with the full contact of the wedge bottom with the top of the material and the simultaneous full contact of the groove bottom with the bottom of the material during an entire insertion of the wedge clip component into the groove clip component with the upwardly protruding loop extending above the wedge clip component for gripping by a user to install the wedge portion in the groove portion, the loop positioned above a narrow insertion end of the wedge clip component for gripping the wedge clip component to slide the wedge clip component into the mating triple tapered groove of the groove clip component and for attaching a tie down element through the protruding loop for tying down the sheet of material after installation of a series of mating groove clip components and wedge clip components spaced apart along a length of the material, the triple tapered wedge portion tapering from the narrow insertion end insertable in the wide front opening of the groove of the wedge clip component to a wide opposite binding end so that the wedge clip component is engaged by the low front opening of the groove clip component after insertion of the wedge clip component in the groove clip component, the wedge clip component tapering from a high insertion end which engages the high back end of the groove clip component after insertion to a low binding end which engages with the low front opening of the groove clip component after insertion with the material therebetween, and the wedge clip component outer sides tapering from a narrow top to a wider flat bottom to form sloping outer sides so that the sloping outer sides of the wedge clip component engage the sloping inner sides of the wedge clip component with the material therebetween after insertion and the flat wedge bottom engages the flat groove bottom after insertion with the material therebetween, thereby forming a two-piece clip device to bind any desired portion of the sheet of material between the wedge clip component and the groove clip component with the portion of the sheet of material sandwiched between the clip components, so that a series of two-piece clip devices spaced apart around a sheet of material at any desired locations on the sheet of material each engage a portion of the sheet of material and each of the protruding loops receives a tie down element attached thereto to tie down the sheet of material, each of the two-piece clip devices having a length and width sufficient to bind a portion of the sheet of material and securely hold it down without tearing the sheet of material.

2. The device of claim 1 wherein the sheet of material comprises a sheet with a grid pattern of intersecting reinforcing elements formed in the sheet of material and the two-piece clip device has a width sufficient to engage a plurality of reinforcing elements and a length sufficient to engage a plurality of reinforcing elements.

3. The device of claim 1 wherein the wedge clip component and groove clip component are each fabricated of a synthetic nylon material so that the components slide easily and resist weathering.

4. The device of claim 1 wherein the sheet of material is a sheet of cover material and a series of the two-piece clip devices are positioned as desired on the sheet of cover material adjacent to tie down locations on an object to be covered.

5. The device of claim 4 wherein the sheet of material is a sheet of cover material for a boat and a series of the two-piece clip devices are positioned as desired on the sheet of cover material adjacent to tie down locations on the boat to be covered.

6. The device of claim 5 wherein the sheet of cover material for a boat comprises a sheet of synthetic material with a grid pattern of intersecting horizontal and vertical reinforcing elements formed in the sheet of material and the two-piece clip device has a width sufficient to engage a plurality of vertical reinforcing elements and a length sufficient to engage a plurality of horizontal reinforcing elements when the two-piece clip is attached with a long centerline of the two-piece clip in a vertical orientation.

\* \* \* \* \*